(12) United States Patent
Reves Balleste et al.

(10) Patent No.: US 9,641,308 B2
(45) Date of Patent: May 2, 2017

(54) DETERMINING AN OPTIMAL POWER BACK-OFF VALUE

(71) Applicant: BROADCOM CORPORATION, Irvine, CA (US)

(72) Inventors: Xavier Josep Reves Balleste, Sarroca de Lleida (ES); Jose Abad Molina, Malaga (ES); Gerard Reves Vilaplana, Barcelona (ES)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 157 days.

(21) Appl. No.: 14/602,198

(22) Filed: Jan. 21, 2015

(65) Prior Publication Data
US 2015/0215102 A1 Jul. 30, 2015

Related U.S. Application Data

(60) Provisional application No. 62/097,544, filed on Dec. 29, 2014, provisional application No. 61/932,682, filed on Jan. 28, 2014.

(51) Int. Cl.
H04L 5/00 (2006.01)
H04L 1/00 (2006.01)
(Continued)

(52) U.S. Cl.
CPC .......... H04L 5/0062 (2013.01); H04L 1/0001 (2013.01); H04L 5/0085 (2013.01);
(Continued)

(58) Field of Classification Search
CPC ..... H04L 1/0001; H04L 43/08; H04L 5/0085; H04L 5/0062; H04W 52/241; H04W 52/367
See application file for complete search history.

(56) References Cited

U.S. PATENT DOCUMENTS

| 2007/0009020 A1* | 1/2007 | Warrier | H04L 1/0001 375/222 |
| 2012/0258760 A1* | 10/2012 | Li | H04M 11/062 455/522 |
| 2015/0071370 A1* | 3/2015 | Wilhelmsson | H04L 1/0006 375/285 |

FOREIGN PATENT DOCUMENTS

FR 1028558 A1 * 8/2000 ............. H04L 5/023

OTHER PUBLICATIONS

Rongping Dong, Meryem Ouzzif, Samir Saoudi. Opportunistic Random Access Scheme De-sign for OFDMA-based Indoor PLC Networks. IEEE Transactions on Power Delivery, In-stitute of Electrical and Electronics Engineers, 2012, 27 (4), pp. 2073-2081. <10.1109/TP-WRD.2012.2203616>. <hal-00739562>.*

* cited by examiner

Primary Examiner — Omar Ghowrwal
(74) Attorney, Agent, or Firm — McDermott Will & Emery LLP

(57) ABSTRACT

A system for providing power back-off includes a channel monitor to measure channel conditions associated with a communication channel between a receiver and a transmitter operating at multiple carrier frequencies. A system monitor retrieves one or more system characteristics associated with the receiver and the transmitter. A mapping module maps measured values of the channel conditions to a number of time slots. A power back off (PBO) module determines a value for an optimal PBO for each time slot based on the measured values of the channel conditions for that time slot and the system characteristics. The communication channel includes a cyclo-stationary channel, and the time slots correspond to a time period of the cyclo-stationary channel.

20 Claims, 8 Drawing Sheets

(51) Int. Cl.
*H04W 52/24* (2009.01)
*H04W 52/36* (2009.01)
*H04L 12/26* (2006.01)

(52) U.S. Cl.
CPC .......... *H04L 43/08* (2013.01); *H04W 52/241* (2013.01); *H04W 52/367* (2013.01)

DETERMINING AN OPTIMAL POWER BACK-OFF VALUE

CROSS-REFERENCE TO RELATED APPLICATIONS

This application claims the benefit of priority under 35 U.S.C. §119 from U.S. Provisional Patent Applications 62/097,544 filed Dec. 29, 2014 and 61/932,682 filed Jan. 28, 2014, which are incorporated herein by reference in its entirety.

TECHNICAL FIELD

The present description relates generally to communications, and more particularly, but not exclusively, to power back-off on channels with cyclo-stationary noise.

BACKGROUND

Many radio and wireline transmitters use the power back-off (PBO) technique in order to reduce the distortion caused by the intermodulation terms generated by the power amplifier(s) of the transmitter. This distortion can act as a bottleneck for the signal-to-noise ratio (SNR) on the transmission side, especially if the energy spectrum of transmitted signal is not totally flat, for instance due to electromagnetic compatibility (EMC) regulations. Additionally, when the spectrum of the transmitted signal is not flat, the power back-off can be used in order to reduce the dynamic range of the signal. This procedure can help to improve the SNR value on the receiver side, if the signal is processed by components having quantification noise. Therefore, the power back-off on transmission can be used to increase the maximum SNR value that the transmitter-receiver (TX-RX) system can grant to the frequency bands with lower energy.

On the other hand, the power back-off technique can reduce the maximum SNR value that the TX-RX system grants to the frequency bands with higher energy. These maximum SNRs value are only limiting if the channel SNR values are higher than these maximum SNR values for each carrier frequency. Otherwise, these maximum SNR values are not behaving as bottlenecks. Currently, wireline communications such as power-line communication (PLC) either do not use PBO or make a limited use of PBO where the applied PBO is independent of the channel noise.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

In one or more aspects, methods and implementations for providing power back-off on channels with cyclo-stationary noise are described. In one or more implementations, the subject technology optimizes the SNR of the transmitter-receiver system by applying the power back-off technique in channels that have cyclo-stationary properties. In one or more aspects, the power back-off is adapted to the noise profile and shape of the channel in different time instants. For a cyclo-stationary noise, the noise profile is somewhat periodic and repeats after a time period (e.g., a cyclo-stationary period). Consequently, the optimal back-off level approximately follows the periodic behavior of the noise (e.g., system and channel noise). In other words, the optimal back-off that optimizes the overall SNR versus time and frequency is also cyclo-stationary.

Figure 1:
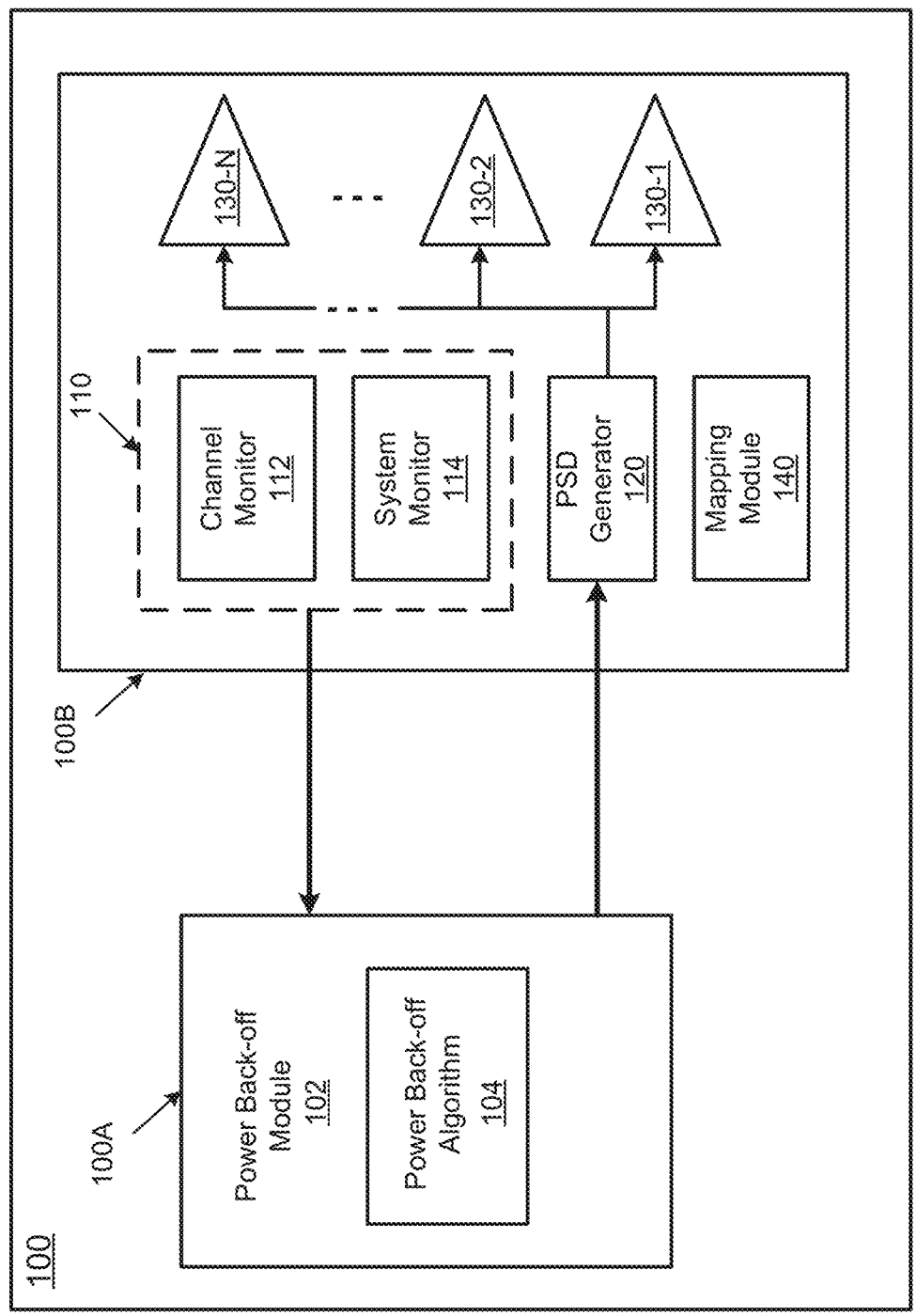
FIG. 1 is a conceptual diagram illustrating an example of an architecture of a system for providing power back-off (PBO) in accordance with one or more implementations.

FIG. 1 is a conceptual diagram illustrating an example of an architecture of a system 100 for providing power back-off (PBO) in accordance with one or more implementations of the subject technology. The system 100 provides power back-off by maximizing an average signal-to-noise ratio (SNR) in a number of time slots of a period of a cyclo-stationary noise. The cyclo-stationary noise can be associated with a communication channel, such as a wireline (e.g., a telephone line, a coaxial cable, or a power line) or a wireless channel between a transmitter and a receiver. The system 100 includes a first block 100-A and a second block 100-B. The first block 100-A includes a PBO module 102 that is based on a PBO algorithm 104. In one or more aspects, the first block 100-A can be implemented in firmware or software. The second block 100-B includes a monitoring module 110, a power data (e.g., power spectral density (PSD)) generator 120, a number of amplifier stages 130 (e.g., digital gain stages 130-1, 130-2 . . . 130-N), and a mapping module 140. In some aspects, the second block 100-B is implemented in hardware, although sortie portions of the second block 100-B can be implemented in firmware or software.

The monitoring block 110 includes a channel monitor 112 and a system monitor 114. The channel monitor 112 includes circuitry that can measures channel conditions associated with the communication channel and operates at multiple carrier frequencies (e.g., 4096 carrier frequencies associated with HomePlug AV2). The channel conditions measured by the channel monitor 112 include, but are not limited to, a channel SNR and a channel attenuation. The channel monitor 112 can measure the noise floor and perform a fast Fourier transform (FFT) on a signal communicated over the channel to analyze a channel response and use that channel response and the measured noise floor to arrive at the channel SNR. Similarly, the channel monitor 112 can use channel frequency response (CFR) and a value of the currently applied PBO to obtain the channel attenuation.

The system monitor 114 includes circuitry that can retrieve one or more system characteristics associated with the receiver and the transmitter. The system characteristics include dynamic ranges associated with the receiver and the transmitter, which can be known or measured once and stored in a database. The system monitor 114 uses the system characteristics to determine a system noise (e.g., receiver noise and transmitter noise) and the corresponding system SNR value based on the determined system noise. It is understood that the system SNR can be improved when higher PBO values are applied to the transmitter amplifier.

The mapping module 140 maps measured values of the channel conditions (e.g., channel SNR and channel attenuation) to the time slots of the cyclo-stationary noise period, as discussed in further detail herein. The PSD generator 120 receives PBO values from the PBO module 102 and generates input data for the digital gain stages 130 that can modify the transmitter output signal power. The PBO module 102 determines a value for an optimal PBO for each time slot based on the measured values of the channel conditions for that time slot and the retrieved system characteristics using the PBO algorithm 104, as described herein.

Figure 2:
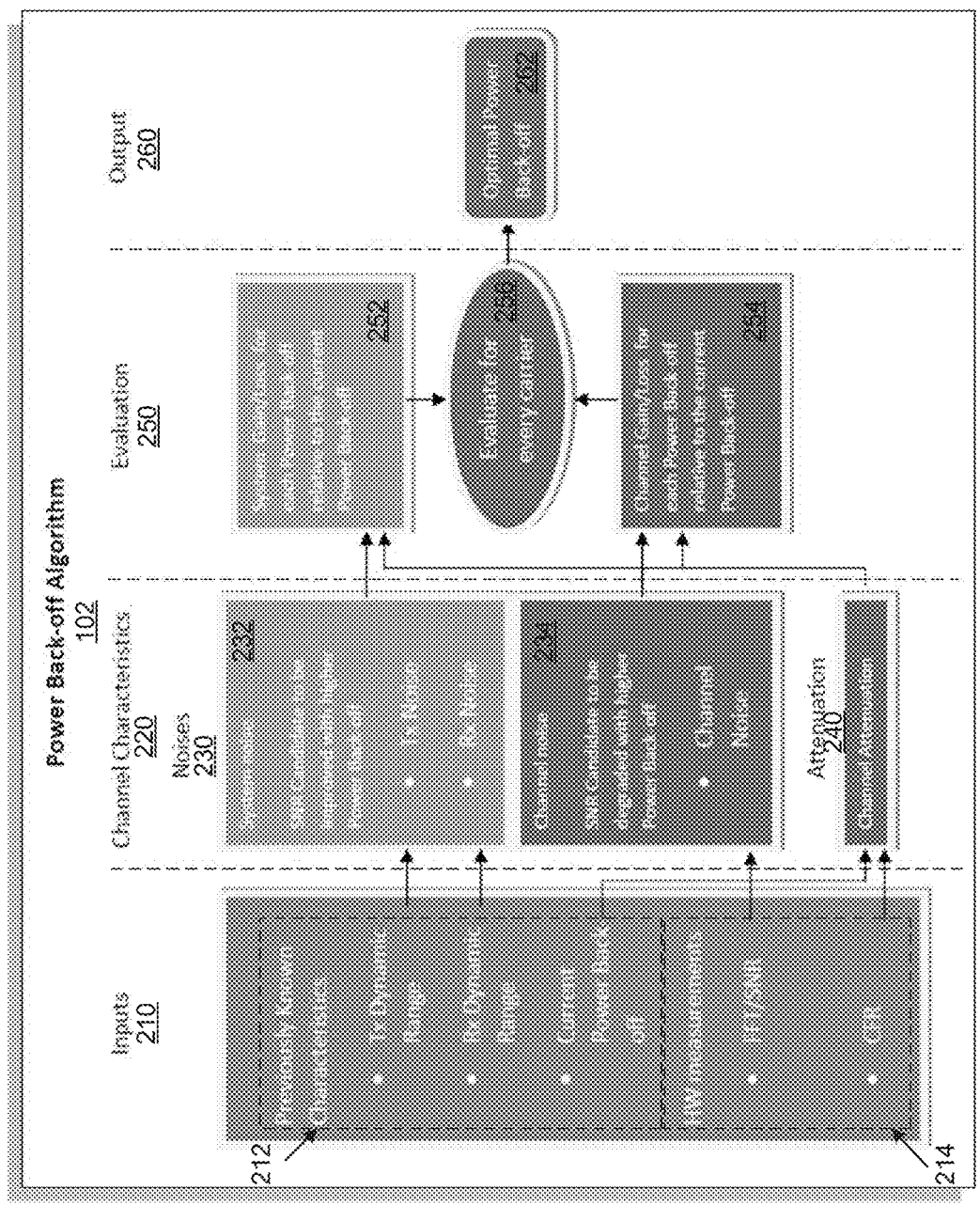
FIG. 2 illustrates an example of a PBO algorithm in accordance with one or more implementations.

FIG. 2 illustrates an example of a PBO algorithm 102 in accordance with one or more implementations of the subject technology. The PBO algorithm 102 is described herein in terms of a number of stages including input data preparation 210, channel characterization 220, evaluation 250, and an output stage 260. The PBO algorithm 102 is the basis for determining the PBO associated with a respective carrier frequency, for each time slot of the cyclo-stationary noise period and an optimal PBO, when all carrier frequencies are considered. According to one or more implementations, in the input data preparation stage 210, the system monitor 114 of FIG. 1 retrieves previously known system characteristics including the dynamic ranges of the transmitter and the receiver and a PBO value that is currently being applied (e.g., a current PBO value). The input preparation stage 210 further includes hardware (HW) measurements performed by the channel monitor 112 of FIG. 1. In some implementations, the channel monitor 112 performs FFT and/or SNR, and CFR measurements.

Leveraging FFT, the noise samples for carriers at different carrier frequencies captured at the receiver input can be used to determine the noise power for those carrier frequencies. The SNR and CFR measurements can be obtained on the receiver side from reference signals sent by the transmitter. The results of these measurements combined with the determined noise floor can be used to obtain the SNR degradation caused by the TX linearity or dynamic range limitations of components of the transmitter with digital quantization.

The channel characterization stage 220 includes noise characterization 230 and channel attenuation determination 240. The noise characterization 230 includes system noise determination block 232, and channel noise determination block 234. In the system noise determination 232, transmit (TX) and receive (RX) noise are determined for the respective carrier frequency in each time slot of the cyclo-stationary noise period based on the measured TX and RX dynamic ranges. In the channel noise determination block 234, a respective channel noise is determined based on the measured FFT and/or SNR results for the carrier frequency in each time slot of the cyclo-stationary noise period. In the channel attenuation determination 240, a current PBO value and the CFR measurement results are used to determine a corresponding channel attenuation for the respective carrier frequency in each time slot of the cyclo-stationary noise period.

The evaluation stage 250 includes operation blocks 252, 254, and 256. At operation block 252, for each carrier frequency and for each time slot of the cyclo-stationary noise period, a change in the system SNR is determined as an applied PBO is varied relative to the current PBO value. Similarly, at operation block 254, for each carrier frequency and for each time slot of the cyclo-stationary noise period, a change in the channel SNR is determined as the applied PBO is varied relative to the current PBO value. For these operations, the algorithm can vary the applied PBO value, for example, by sweeping through a number of values (e.g., incrementing or decrementing the applied BPO with respect to the current PBO) and examine the system SNR and channel SNR to determine any gain or loss of system SNR and channel SNR as the applied PBO value is varied. At operation block 256, the gain or loss of the system SNR and the channel SNR are evaluated to determine a desired output, which is an optimal PBO.

The optimal PBO is determined by evaluating the overall SNR gain or loss when a carrier frequencies are considered. The system and channel SNR gains or losses can be combined. For example, consider a two carrier frequency system, with a high-power carrier frequency (e.g., $f_1$ carrier) at 10 dB and a low-power carrier frequency (e.g., $f_2$ carrier) at 0 dB. If the measured combined SNRs (e.g., system and channel SNRs) are 20 db for the $f_1$ carrier and 10 dB for the $f_2$ carrier, and if after applying a 6 dB PBO (e.g., reducing signal power by 6 dB) the combined SNR for each of the $f_1$ and $f_2$ carriers is measured to be 18 db, the $f_1$ carrier has lost 2 dB (18 dB-20 dB) while the $f_2$ carrier has gained 8 db (18 dB-10 dB). In this scenario, for the $f_1$ and $f_2$ carriers, an overall gain of 6 fB (8 dB-2 dB) is realized for an applied PBO of 6 dB. Similarly, at a number of other values of the applied PBO, the overall gain or loss of the combined SNR is evaluated and the optimum value of the PBO is determined as the value of the applied PBO that results in the maximum overall gain in the combined SNR. At the output stage 260, the optimal PBO 262 is reported to the PSD generator 120 of FIG. 1 to be applied to the transmitter.

Figure 3:
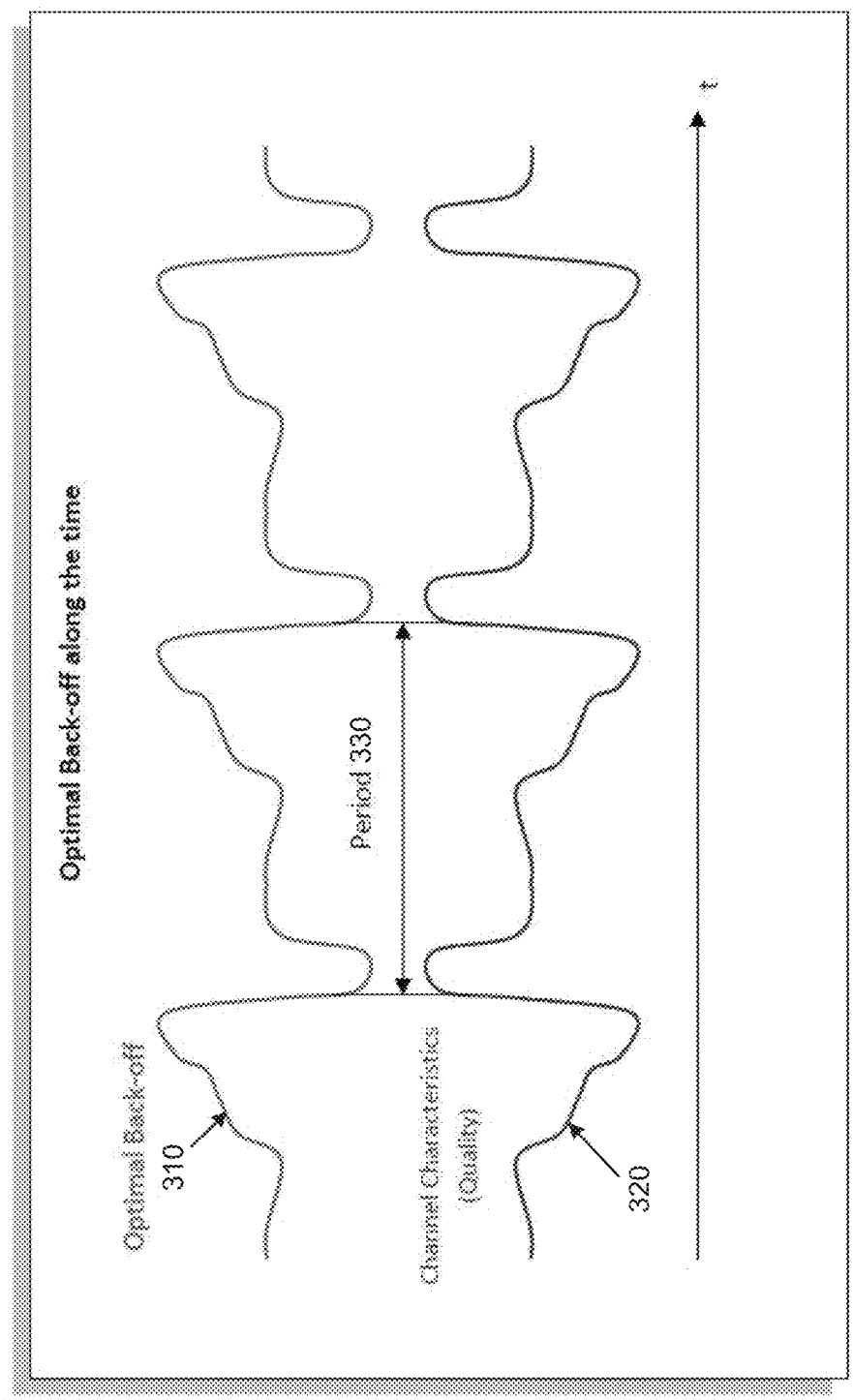
FIG. 3 is a diagram illustrating a time variation of an example optimal PBO in accordance with one or more implementations.

FIG. 3 is a diagram illustrating a time variation of an example optimal PBO 310 in accordance with one or more implementations of the subject technology. The diagram in FIG. 3 shows time variation of the channel characteristics 320 (e.g., quality such as SNR) as measured, for example, by the monitoring module 110 of FIG. 1. The channel characteristics 320 (e.g., measured in dB) shows a periodic behavior with a period 330 (e.g., cyclo-stationary noise period). In an ideal situation, the time variation of the applied PBO is similar to (e.g. matches) the periodic behavior of the channel characteristics 320, as shown by the optimal PBO 310. For example, at a time instance that the channel characteristics 320 is at its lowest point, the optimal PBO 310 is at its highest point and when the channel characteristics 320 is at its highest point, the optimal PBO 310 is at its lowest point. In real systems, the evaluation can only be made at discrete time intervals. The subject disclosure describes two approaches including an equidistant slot approach and an adaptive slot approach for determining the optimal PBO.

Figure 4A:
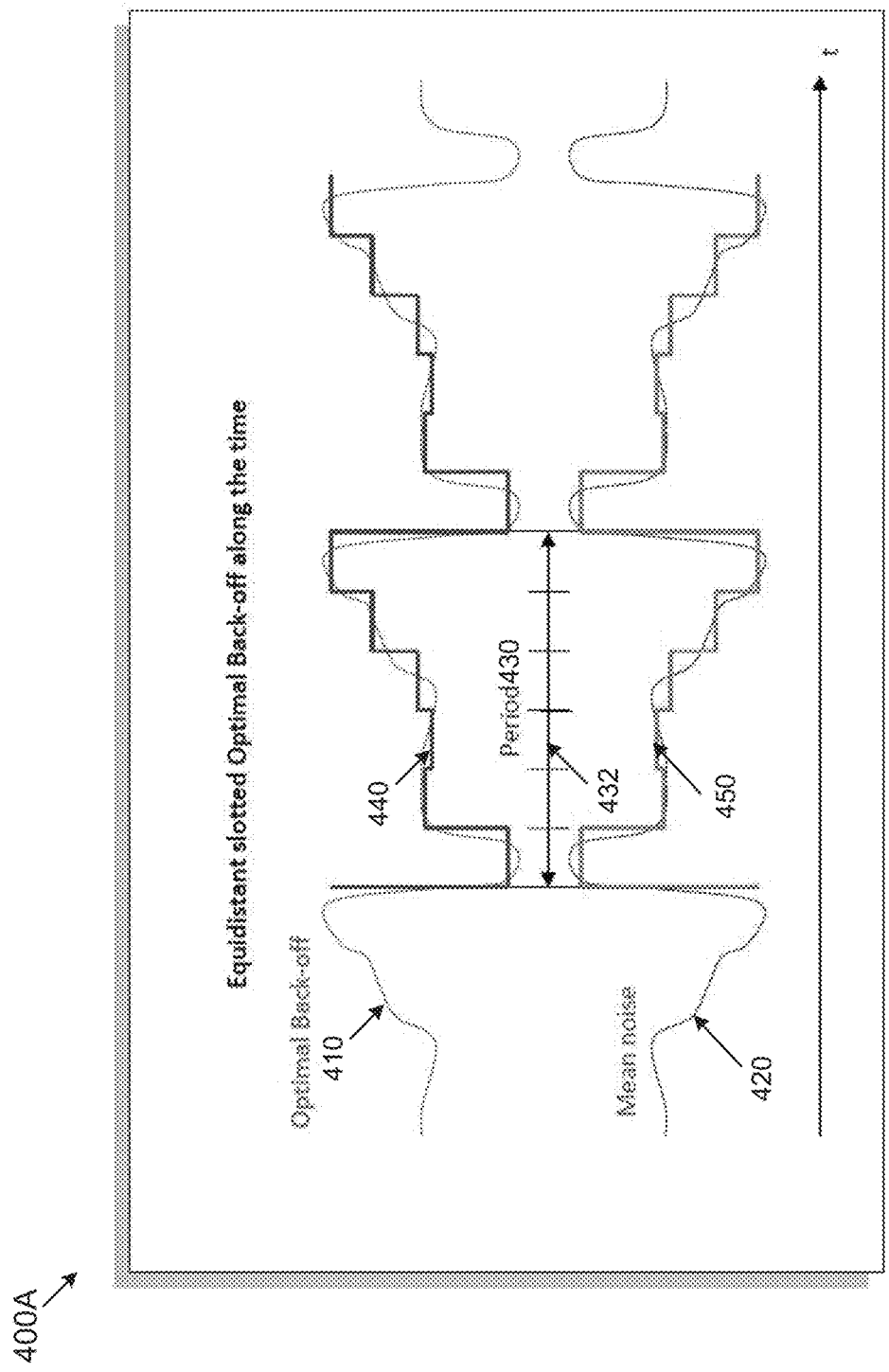
FIGS. 4A-4B are diagrams illustrating time variations of examples of an equidistant and an adaptive slot optimal PBO in accordance with one or more implementations.
Figure 4B:
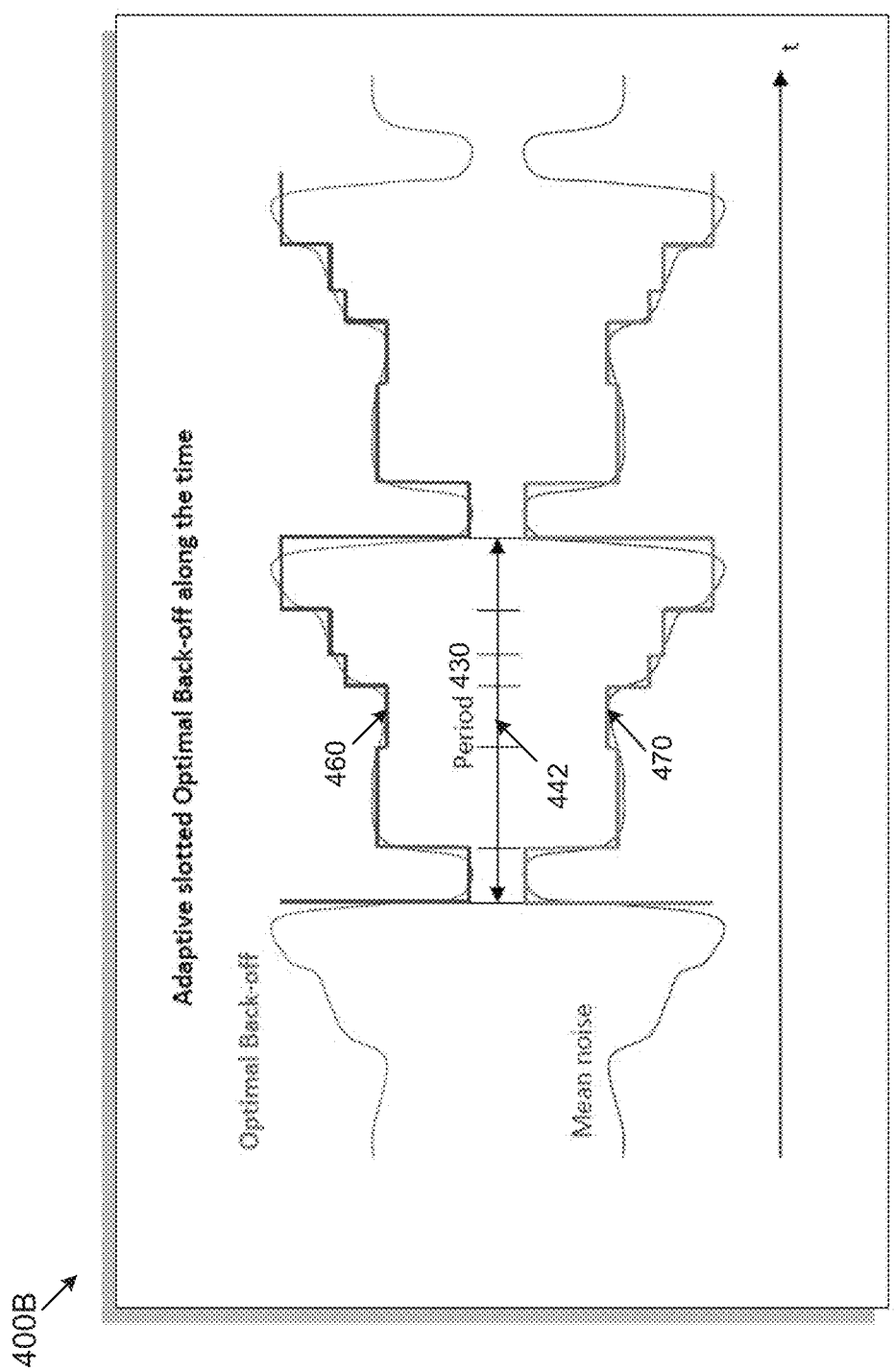

FIGS. 4A-4B are diagrams 400A and 400B illustrating time variations of examples of an equidistant and an adaptive slot optimal PBO in accordance with one or more implementations of the subject technology. The diagram 400A of FIG. 4A shows the equidistant slot method of determining the optimal PBO. For the shown equidistant slot method, the period 430 is divided into N (e.g., 6) equal time slots (e.g., 432). The values of the mean noise (e.g., a combined system and channel SNR in dB) for each time slot 432 is determined based on the measured system and channel characteristics (e.g., by the monitoring module 110 of FIG. 1). The value of the optimal PBO 440 for each time slot 432 is then determined, for example, by the PBO module 110-A of FIG. 1 based on the mean noise 450 for that time slot, as described with respect to FIGS. 2 and 3 above.

The diagram 400B of FIG. 4B depicts the adaptive slot method of determining the optimal PBO. For the shown adaptive slot method, the period 430 is divided into N (e.g., 6) time slots (e.g., 442), which are not equal and are determined adaptively by the PBO algorithm as is described herein. The value of the optimal PBO 460 for each time slot 442 is determined, for example, by the PBO module as described herein. Because in the adaptive slot solution the difference between the discretized line and the real line is reduced, as compared to the equidistant method, the behavior of the adaptive slot solution is closer to the optimal. Both of the equidistant and adaptive slot methods can be used, for instance, in power-line communications (PLC), where the nature of the noise is cyclo-stationary and, at the same time, the injected power is not flat along the frequency for some standards, for example, due to the EMC regulations. The subject technology allows the overall SNR to be optimized with respect to the frequency and time.

Figure 5:
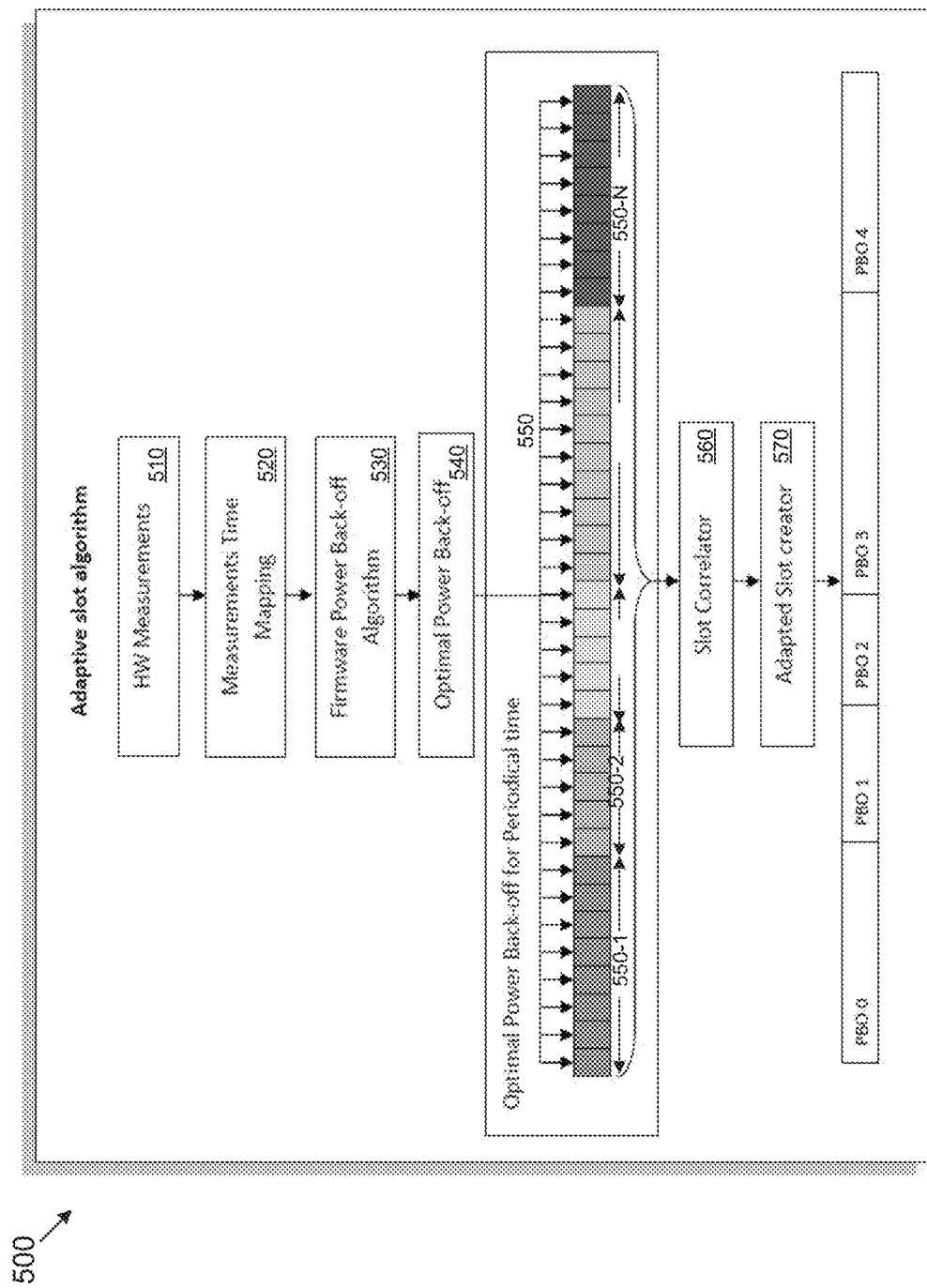
FIG. 5 illustrates an example of an adaptive slot PBO algorithm in accordance with one or more implementations.

FIG. 5 illustrates an example of an adaptive slot PBO algorithm 500 in accordance with one or more implementations of the subject technology. According to the PBO algorithm 500, the system and channel SNR are measured by the hardware (e.g., 110 of FIG. 1) (510). As it can be appreciated, in order to obtain the adaptive slotted power back-off, it is needed to map the measurement results to the proper cyclo-stationary time slots (e.g., 432 of FIG. 4A). The measurement time mapping (520) can be performed by the mapping module 140 of FIG. 1. The mapping module 140 can use the time stamp of the noise measurements to perform mapping of the measurement results to the proper cyclo-stationary time slots. The small and uniformly distributed time slots 432, of equal length, have a high granularity, and this granularity defines the resolution of the output adaptive slots. For each of these small time slots 550, the PBO algorithm is employed (530), in a cyclo-stationary way as described with respect to FIG. 4A, to obtain the optimal PBO (540) for each of the small time slots (e.g., 550). The time slots 550 (e.g., initial time slots) can be processed in order to be grouped into longer temporal slots (e.g., 550-1 . . . 550-n) considering their PBO value similarities. In some implementations, a slot correlator module 560 is in charge of characterizing the similarities of the PBO values by comparing each time slot 500 to other neighboring time slots. In one or more implementations, an adapted slot creator module 570 can create the adaptive slots with variable length (e.g., 550-1 . . . 550-n) by employing the data obtained from the slot correlator 560. The process consists of splitting the PBO values with low correlation on different adaptive slots to generate PBO values, for example PBO0, PBO1 . . . BP4, for the respective adaptive slots, which results in the example PBO variation of FIG. 4B.

Figure 6:
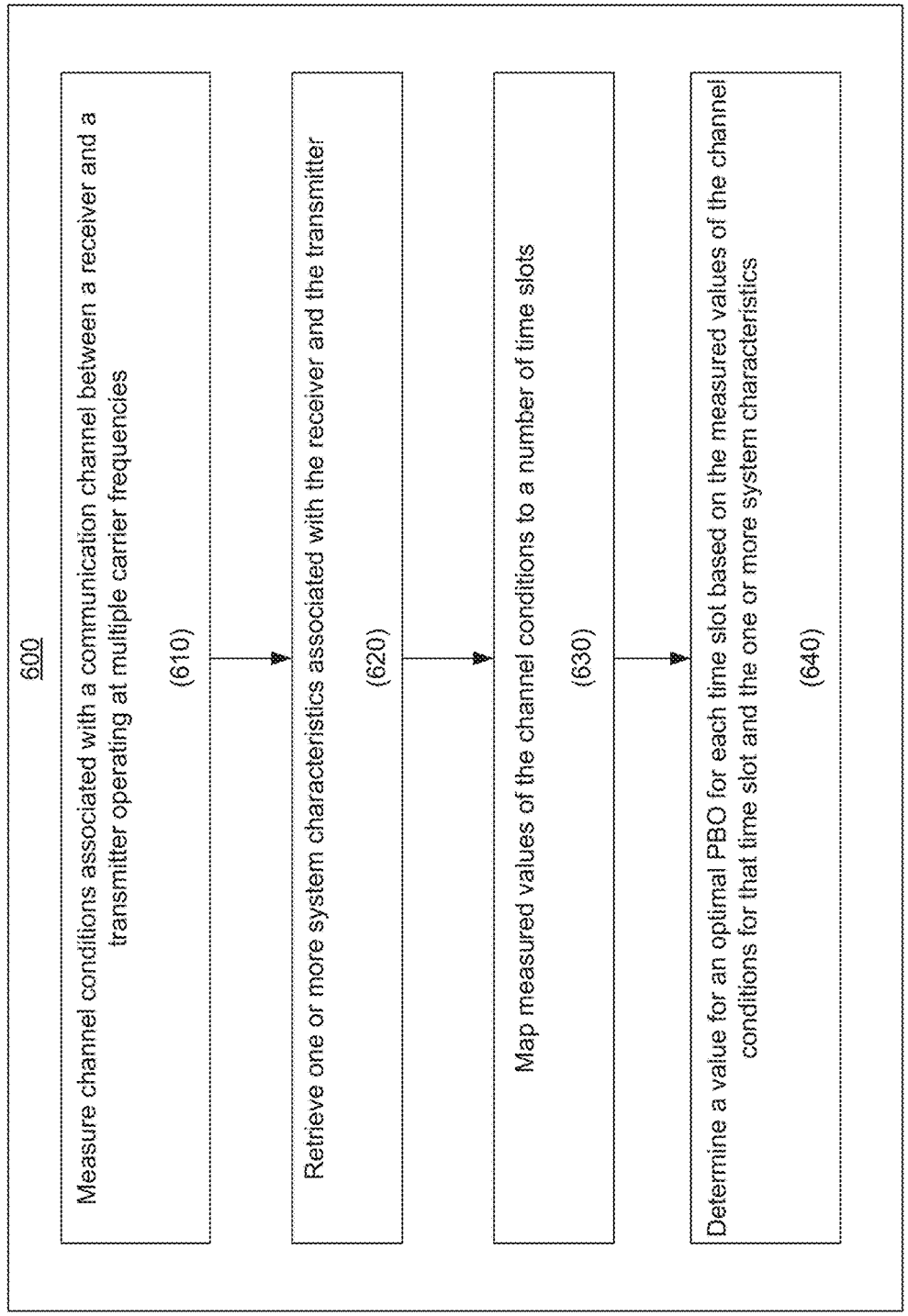
FIG. 6 illustrates an example of a method for providing PBO in accordance with one or more implementations.

FIG. 6 illustrates an example of a method 600 for providing PBO in accordance with one or more implementations of the subject technology. For explanatory purposes, the blocks of the example method 600 are described herein as occurring in serial, or linearly. However, multiple blocks of the example method 600 can occur in parallel. In addition, the blocks of the example method 600 need not be performed in the order shown and/or one or more of the blocks of the example method 600 need not be performed.

The method 600 includes measuring (e.g., by 112 of FIG. 1) channel conditions (e.g., 214 of FIG. 2) associated with a communication channel between a receiver and a transmitter operating at multiple carrier frequencies (610). One or more system characteristics (e.g., by 212 of FIG. 2) associated with the receiver and the transmitter is retrieved (e.g., by 114 of FIG. 1) (620). Measured values of the channel conditions are mapped (e.g., by 140 of FIG. 1) to a number of time slots (e.g., by 432 of FIG. 4A) (630). A value for an optimal PBO (e.g., by 440 of FIG. 4A) is determined for each time slot based on the measured values of the channel conditions (e.g., by 450 of FIG. 4A) for that time slot and the one or more system characteristics (640). The communication channel includes a cyclo-stationary channel, and the time slots correspond to a time period (e.g., 430 of FIG. 4A) of the cyclo-stationary channel.

Figure 7:
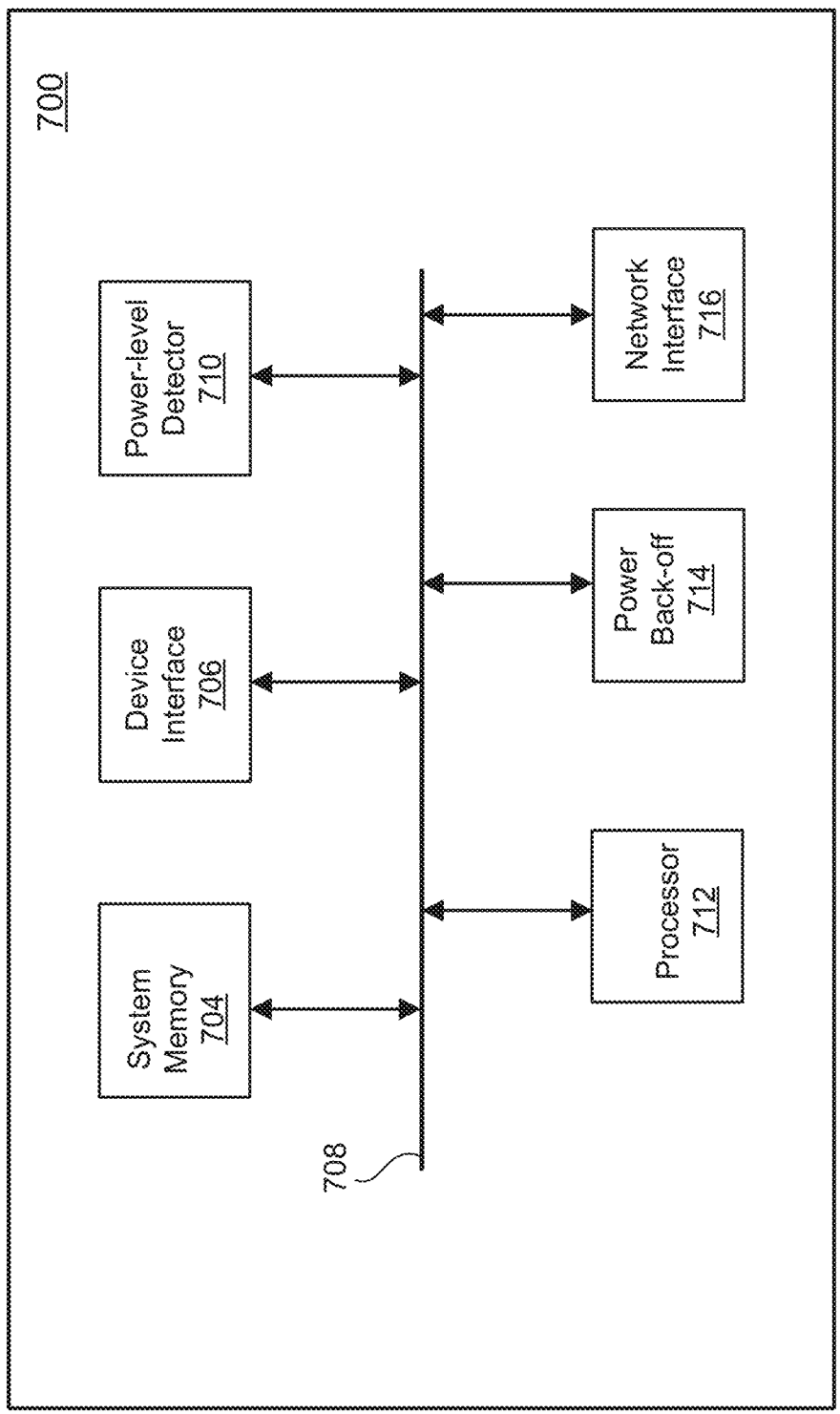
FIG. 7 illustrates an example of a communication system employing features of the subject technology for providing PBO in accordance with one or more implementations.

FIG. 7 illustrates an example of a communication system 700 employing features of the subject technology for providing PBO in accordance with one or more implementations of the subject technology. Not all of the depicted components are required, however, and one or more implementations include additional components not shown in the figure. Variations in the arrangement and type of the components can be made without departing from the spirit or scope of the claims as set forth herein. Additional, different or fewer components can be provided. The communication system 700, for example, can be a power-line network adapter and/or modem, digital subscriber line (DST) adapter and/or modem, multimedia over coax alliance (MOCA) adapter and/or modem, telephone line adapter and/or modem, wireless adapter and/or modem, and/or generally any electronic device that transmits signals over a network. Such an electronic system includes various types of computer readable media and interfaces for various other types of computer readable media. The communication system includes a bus 708, one or more processor(s) 712, a system memory 704, a device interface 706, a power back-off block 714, a network interface 716, and a power level detector 710.

The bus 708 collectively represents all system, peripheral, and chipset buses that communicatively connect the numerous internal devices of the communication system. In one or more implementations, the bus 708 communicatively connects the one or more processor(s) 712 with the system memory 704. The one or more processing unit(s) can be a single processor or a multi-core processor in different implementations. The system memory 704 can be a read-and-write memory device. The system memory 704 can be, and/or can include, a volatile read-and-write memory, such as random access memory, or a non-volatile read-and-write memory, such as a permanent storage device. The system memory 704 stores any of the instructions and/or data that the one or more processor(s) 712 needs at runtime. In one or more implementations, the processes of the subject disclosure are stored in the system memory 704. From these various memory units, the one or more processor(s) 712 retrieves instructions to execute and data to process in order to execute the processes of one or more implementations.

The bus 708 also couples the communication system to a network (not shown), such as the networks 106A-B, through network interface 716, and to a device, such as a computing device, through the device interface 706. The network interface 716 couples the communication system to a power-line, a telephone line, a coaxial cable line, or generally any line that can carry, or propagate, a data signal. In one or more implementations, the device interface 706 couples the communication system to a computing device, such as via an Ethernet connection. The computing device can then be a part of a network of computers (such as a local area network ("LAN"), a wide area network ("WAN"), or an Intranet, or a network of networks, such as the Internet, via the network interface 716 of the communication system.

Lastly, the bus 708 communicatively connects the one or more processor(s) 712 to a power level detector 710, e.g. a power level detector implemented in silicon and a power back-off block 714. The power level detector 710 can be used to determine the signal strength values and/or the signal attenuation values of any received signals. In one or more implementations, the power level detector 710 determines the attenuation of a received signal based on the amount of gain applied to the received signal, such as by an automatic gain control circuit that can, in one or more implementations, be part of, and/or implemented by, the one or more processor(s) 712. The power back-off block 714 can be implemented in hardware or firmware or a combination of hardware, firmware, and software. The power back-off block 714 is similar to the system 100 of FIG. 1 and can provide an optimal PBO for a transmitter coupled to the network interface 716. In some implementations, any or all components of communication system 700 can be used in conjunction with the subject disclosure.

Those of skill in the art would appreciate that the various illustrative blocks, modules, elements, components, and methods described herein can be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans can implement the described functionality in varying ways for each particular application. Various components and blocks can be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect can apply to all configurations, or one or more configurations. An aspect can provide one or more examples of the disclosure. A phrase such as an "aspect" refers to one or more aspects and vice versa. A phrase such as an "embodiment" does not imply that such embodiment is essential to the subject technology or that such embodiment applies to all configurations of the subject technology. A disclosure relating to an embodiment can apply to all embodiments, or one or more embodiments. An embodiment can provide one or more examples of the disclosure. A phrase such an "embodiment" can refer to one or more embodiments and vice versa. A phrase such as a "configuration" does not imply that such configuration is essential to the subject technology or that such configuration applies to all configurations of the subject technology. A disclosure relating to a configuration can apply to all configurations, or one or more configurations. A configuration can provide one or more examples of the disclosure. A phrase such as a "configuration" can refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A system for providing power back-off (PBO), the system comprising:
    channel monitor circuitry configured to measure channel conditions associated with a communication channel between a receiver and a transmitter operating at a plurality of carrier frequencies;
    system monitor circuitry configured to retrieve one or more system characteristics associated with the receiver and the transmitter;
    a mapping module configured to map measured values of the channel conditions to a plurality of time slots; and
    a PBO module configured to determine a value for an optimal PBO for each time slot of the plurality of time slots based on the measured values of the channel conditions for that time slot and the one or more system characteristics, wherein:
the communication channel comprises a cyclo-stationary channel, and
the plurality of time slots correspond to a time period of the cyclo-stationary channel.

2. The system of claim 1, wherein the channel monitor circuitry is configured to measure the channel conditions comprising a channel signal-to-noise (SNR) and a channel attenuation, and wherein the channel attenuation is measured using a current PBO value.

3. The system of claim 1, wherein the system monitor circuitry is configured to retrieve the one or more system characteristics including dynamic ranges associated with the receiver and the transmitter and to determine a system SNR based on the one or more system characteristics.

4. The system of claim 1, wherein the PBO module is configured to determine the value for the optimal PBO for each time slot of the plurality of time slots by evaluating, for each carrier frequency of the plurality of carrier frequencies, a change in a respective SNR as an applied PBO value is varied relative to a current PBO value.

5. The system of claim 4, wherein the PBO module is configured to evaluate the change in the respective SNR by combining changes in a system SNR and a channel SNR as the applied PBO value is varied relative to the current PBO value.

6. The system of claim 5, wherein the value for the optimal PBO for each time slot of the plurality of time slots is determined to be the applied PBO value that results in a largest change in the respective SNR.

7. The system of claim 1, wherein the plurality of time slots comprise equal time slots.

8. The system of claim 1, wherein the plurality of time slots comprise adaptive time slots, wherein the system comprises an adaptive slot generator that is configured to generate each adaptive time slot by merging multiple initial time slots for which PBO values are similar.

9. The system of claim 8, wherein a PBO value associated with each adaptive time slot is determined based on a mean value of the PBO values associated with the multiple initial time slots.

10. A method for providing power back-off (PBO), the method comprising:
measuring channel conditions associated with a communication channel between a receiver and a transmitter operating at a plurality of carrier frequencies;
retrieving one or more system characteristics associated with the receiver and the transmitter;
mapping measured values of the channel conditions to a plurality of time slots; and
determining a value for an optimal PBO for each time slot of the plurality of time slots based on the measured values of the channel conditions for that time slot and the one or more system characteristics,
wherein:
the communication channel comprises a cyclo-stationary channel, and
the plurality of time slots correspond to a time period of the cyclo-stationary channel.

11. The method of claim 10, wherein measuring channel conditions comprises measuring a channel signal-to-noise (SNR) and a channel attenuation, and wherein measuring the channel attenuation comprises using a current PBO value.

12. The method of claim 10, wherein retrieving the one or more system characteristics comprises retrieving dynamic ranges associated with the receiver and the transmitter and determining a system SNR based on the one or more system characteristics.

13. The method of claim 10, wherein determining the value for the optimal PBO for each time slot of the plurality of time slots comprises evaluating, for each carrier frequency of the plurality of carrier frequencies, a change in a respective SNR as an applied PBO value is varied relative to a current PBO value.

14. The method of claim 13, further comprising evaluating the change in the respective SNR comprises combining changes in a system SNR and a channel SNR as the applied PBO value is varied relative to the current PBO value.

15. The method of claim 14, further comprising determining the value for the optimal PBO for each time slot of the plurality of time slots to be the applied PBO value that results in a largest change in the respective SNR.

16. The method of claim 10, wherein the plurality of time slots comprise equal time slots.

17. The method of claim 10, wherein the plurality of time slots comprise adaptive time slots, wherein the method further comprises generating each adaptive time slot by merging multiple initial time slots for which PBO values are similar.

18. The method of claim 17, further comprises determining a PBO value associated with each adaptive time slot based on a mean value of the PBO values associated with the multiple initial time slots.

19. A network adaptor system comprising:
a network interface configured to communicate through a communication channel comprising a cyclo-stationary channel and operating at a plurality of carrier frequencies; and
a power back-off (PBO) block configured to provide an optimal PBO, the PBO block comprising:
channel monitor circuitry configured to measure channel conditions associated with the communication channel;
system monitor circuitry configured to obtain one or more system characteristics associated with a receiver and a transmitter coupled via the communication channel;
a mapping module configured to map measured values of the channel conditions to a plurality of time slots; and
a PBO module configured to provide the optimal PBO by determining a value for the optimal PBO for each time slot of the plurality of time slots based on the measured values of the channel conditions for that time slot and the one or more system characteristics, wherein the plurality of time slots correspond to a time period of the cyclo-stationary channel.

20. The network adaptor system of claim 19, wherein:
the communication channel comprises one of a power-line, a coaxial cable, a telephone line, or a wireless communication channel,
the PBO module is configured to:
determine the value for the optimal PBO for each time slot of the plurality of time slots by evaluating, for each carrier frequency of the plurality of carrier frequencies, a change in a respective SNR as an applied PBO value is varied relative to a current PBO value; and
evaluate the change in the respective SNR by combining changes in a system SNR and a channel SNR as the applied PBO value is varied relative to the current PBO value, wherein the value for the optimal PBO for each time slot of the plurality of time slots is determined to be the applied PBO value that results in a largest change in the respective SNR.

* * * * *